(12) United States Patent
Shim et al.

(10) Patent No.: US 12,520,339 B2
(45) Date of Patent: Jan. 6, 2026

(54) SHIP-CENTRIC DIRECT COMMUNICATION SYSTEM AND OPERATION METHOD THEREOF

(71) Applicant: Korea Institute of Ocean Science & Technology, Busan (KR)

(72) Inventors: Woo Seong Shim, Daejeon (KR); Bu Young Kim, Daejeon (KR)

(73) Assignee: Korea Institute of Ocean Science & Technology, Busan (KR)

( * ) Notice: Subject to any disclaimer, the term of this patent is extended or adjusted under 35 U.S.C. 154(b) by 0 days.

(21) Appl. No.: 18/493,183

(22) Filed: Oct. 24, 2023

(65) Prior Publication Data

US 2024/0147522 A1    May 2, 2024

(30) Foreign Application Priority Data

Oct. 26, 2022   (KR) .......................... 10-2022-0139500

(51) Int. Cl.
*H04L 25/02*      (2006.01)
*H04W 74/00*    (2009.01)

(52) U.S. Cl.
CPC ................................. *H04W 74/002* (2013.01)

(58) Field of Classification Search
CPC .............. H04L 25/025; H04L 25/0202; H04L 2201/02
USPC ........ 370/329; 375/227, 229, 230, 232, 233, 375/278, 324
See application file for complete search history.

(56) References Cited

U.S. PATENT DOCUMENTS

| 8,843,142 | B2 * | 9/2014 | Nishio ................. H04B 7/0617 375/267 |
| 10,791,013 | B2 * | 9/2020 | Tang ................... H04L 27/2605 |
| 2002/0003774 | A1 * | 1/2002 | Wang .................. H04L 27/2626 370/208 |
| 2007/0263712 | A1 * | 11/2007 | Ling ........................ H04L 1/20 375/227 |

FOREIGN PATENT DOCUMENTS

| CN | 1492699 A | * | 4/2004 | .............. H04B 1/69 |
| JP | 2016-116205 A | | 6/2016 | |

(Continued)

*Primary Examiner* — Huy D Vu
(74) *Attorney, Agent, or Firm* — Harness, Dickey & Pierce, P.L.C.

(57) ABSTRACT

A ship-centric direct communication system and an operation method thereof are proposed. The system includes a data transmission device configured to transmit, to a data reception device through a link channel, a transmission frame composed of a plurality of slots generated according to slot time, a plurality of pilots provided for channel estimation and arranged at respective specific positions in each of the plurality of slots according to a pilot transmission period, and data symbols arranged between each of the plurality of pilots, and the data reception device configured to perform channel compensation for data present between the plurality of pilots by using the plurality of pilots for each of the plurality of slots of the transmission frame when the transmission frame is received from the data transmission device and performing linear interpolation after the channel estimation in a frequency domain, and convert channel-compensated signals back into time domain symbols.

2 Claims, 8 Drawing Sheets

(56) References Cited

FOREIGN PATENT DOCUMENTS

| | | | |
|---|---|---|---|
| KR | 100989098 | B1 | 10/2010 |
| KR | 101275852 | B1 | 6/2013 |
| KR | 101858993 | B1 | 5/2018 |
| KR | 2022-0111381 | A | 8/2022 |

* cited by examiner

SHIP-CENTRIC DIRECT COMMUNICATION SYSTEM AND OPERATION METHOD THEREOF

CROSS REFERENCE TO RELATED APPLICATION

The present application claims priority to Korean Patent Application No. 10-2022-0139500, filed Oct. 26, 2022, the entire contents of which is incorporated herein for all purposes by this reference.

BACKGROUND OF THE INVENTION

Field of the Invention

The present disclosure relates to a ship-centric direct communication system and an operation method thereof and, more particularly, to a ship-centric direct communication system and an operation method thereof enabling a spread spectrum signal having a lower power density per frequency to be obtained when an original signal is input into a pseudo-random noise sequence, and also enabling the original signal to be reproduced when the same sequence as the pseudo-random noise sequence is used on a receiving side.

Description of the Related Art

A transmission method based on single carrier frequency domain equalization (SC-FDE) is a transmission method for adding a cyclic prefix (CP) to an existing single carrier method.

Accordingly, the SC-FDE transmission method enables channel equalization in a frequency domain without using a complex time-domain channel equalization method in a receiver, so that wireless channel distortion may be compensated relatively simply in a fading channel having frequency-selective characteristics, whereby some SC-FDE transmission methods are in use in broadband wireless communication systems.

A channel compensation method of SC-FDE is similar to that of orthogonal frequency division multiplexing (OFDM), but OFDM has a large peak-to-average power ratio (PAPR) of a signal, so there is a problem that power efficiency of a transmitter is low and power consumption is high. Such a problem is especially serious in communication devices that operate on batteries.

However, because of having the single carrier transmission method thereof, the SC-FDE method may have a PAPR that is relatively small compared to OFDM, and may eventually reduce the power consumption of the transmitter, thereby being more suitable for battery-operated systems.

Meanwhile, since the SC-FDE method uses single carrier frequencies, there is a problem that mutual interference or multipath fading may occur during downlink transmission to a plurality of receivers. Accordingly, current wireless communication systems take a compromise form of using the OFDM method in the downlink and using the SC-FDMA method in the uplink. However, in communication links between ground station devices and unmanned ships, there is a problem in that protocols for which communication method to use are different depending on the uncrewed ships.

Meanwhile, for channel estimation, a transmitter should transmit a pilot signal. A receiver may estimate a channel upon recognizing that the pilot signal transmitted by the transmitter arrives distorted. Pilots should be transmitted periodically, and the that reason is wireless channel characteristics between transmission and reception may change over time when a communication device is moving or there is a change in the surrounding environment, so the periodic pilots are required in order to periodically estimate and update the channel characteristics.

Accordingly, in a fast-moving environment, pilots should be transmitted more frequently, thereby causing a problem that overhead thereof is increased due to the pilots and actual user transmission speed is decreased.

Korean Patent No. 10-1275852 relates to a transmission and reception apparatus and method thereof based on SC-FDE using unique word (UW) and discloses contents of the apparatus including: a modulator for modulating input data by using a predetermined modulation method and outputting a data symbol; and a UW insertion unit for adding two unique words (UWs) to a front end of the data symbol and one UW to a back end of the data symbol.

Korean Patent Application Publication No. 10-2022-0111381 relates to a transmitting and receiving method for phase noise compensation of a SC-FDE method and an apparatus for the same, and discloses contents that data is transmitted and received in order to estimate and compensate for phase noise when data is transmitted and received by using a single carrier-frequency domain equalizer (SC-FDE) method in a communication band above millimeter wave.

Korean Patent No. 10-0989098 relates to a method for generating a data frame based on GMSK modulation in a SC-FDE system, and discloses contents that phase discontinuity may be prevented by respectively combining a first data symbol column and a second data symbol column with a first flush symbol and zero symbol and a second flush symbol and zero symbol.

Korean Patent No. 10-1858993 relates to a method of reducing pilot overhead in a SC-FDE transmission structure and discloses contents that a transmitter occasionally transmits pilots, a receiver uses the pilots to estimate a channel, and the channel between the pilots is estimated by using linear interpolation.

DOCUMENTS OF RELATED ART

Patent Documents (Patent Document 1) (Related art 1) Korean Patent No. 10-1275852
(Patent Document 2) (Related art 2) Korean Patent Application Publication No. 10-2022-0111381
(Patent Document 3) (Related art 3) Korean Patent No. 10-0989098
(Patent Document 4) (Related art 4) Korean Patent No. 10-1858993

SUMMARY OF THE INVENTION

An objective of the present disclosure is to provide a ship-centric direct communication system and an operation method thereof capable of maximally reducing impacts of multipath fading caused by sea level and expected in a case where a high frequency band is used at sea in order to develop MX-S2X communication that utilizes communication technology of broadband based on high frequencies (hereinafter referred to as MX) higher than a band having 300 MHz or less allocated to existing maritime mobile services.

In addition, another objective of the present disclosure is to provide a ship-centric direct communication system and an operation method thereof enabling a spread spectrum signal having a lower power density per frequency to be obtained when an original signal is input into a pseudo-random noise sequence, and also enabling the original signal to be reproduced when the same sequence as the pseudo-random noise sequence is used on a receiving side, so that modulation efficiency is good, signal synchronization is fast, and there is little in-band interference due to the lower power density.

The objectives of the present disclosure are not limited to the above-mentioned objectives, and other objectives and strong points of the present disclosure not mentioned above may be understood by the following description, and may be more clearly understood by the exemplary embodiments of the present disclosure. Further, it will be readily apparent that the objectives and merits of the present disclosure may be realized by the means and combinations thereof indicated in the appended claims.

In order to achieve such objectives, there is provided a ship-centric direct communication system including a data transmission device and a data reception device, the system including: the data transmission device configured to transmit, to the data reception device through a link channel, a transmission frame composed of a plurality of slots generated according to slot time, a plurality of pilots provided for channel estimation and arranged at respective specific positions in each of the plurality of slots according to a pilot transmission period, and data symbols arranged between each of the plurality of pilots; and the data reception device configured to perform channel compensation for data present between the plurality of pilots by using the plurality of pilots for each of the plurality of slots of the transmission frame when the transmission frame is received from the data transmission device and performing linear interpolation after the channel estimation in a frequency domain, and convert channel-compensated signals back into time domain symbols.

In addition, in order to achieve such objectives, there is provided a method of operating a ship-centric direct communication system, the method including: transmitting, by a data transmission device to a data reception device through a link channel, a transmission frame composed of a plurality of slots generated according to slot time, a plurality of pilots provided for channel estimation and arranged at respective specific positions in each of the plurality of slots according to a pilot transmission period, and data symbols arranged between each of the plurality of pilots; performing, by the data reception device, channel compensation for data present between the plurality of pilots by using the plurality of pilots for each of the plurality of slots of the transmission frame when the transmission frame is received and by performing linear interpolation after the channel estimation in a frequency domain; and converting, by the data reception device, channel-compensated signals back into time domain symbols.

According to the present disclosure as described above, there is provided a strong point of maximally reducing impacts of multipath fading caused by sea level and expected in a case where a high frequency band is used at sea in order to develop MX-S2X communication that utilizes communication technology of broadband based on high frequencies (hereinafter referred to as MX) higher than a band having 300 MHz or less allocated to existing maritime mobile services.

In addition, according to the present disclosure, there is provided another strong point of enabling a spread spectrum signal having a lower power density per frequency to be obtained when an original signal is input into a pseudo-random noise sequence, and also enabling the original signal to be reproduced when the same sequence as the pseudo-random noise sequence is used on a receiving side, so that modulation efficiency is good, signal synchronization is fast, and there is little in-band interference due to the lower power density.

DETAILED DESCRIPTION OF THE INVENTION

The above-described objectives, features, and strong points will be described below in detail with reference to the accompanying drawings, and accordingly, those skilled in the art to which the present disclosure pertains will be able to easily implement the technical idea of the present disclosure. In addition, in describing the present disclosure, when it is determined that a detailed description of a known technology related to the present disclosure may unnecessarily obscure the subject matter of the present disclosure, the detailed description thereof will be omitted. Hereinafter, an exemplary embodiment of the present disclosure will be described in detail with reference to the accompanying drawings. In the drawings, identical reference numerals are used to indicate identical or similar components.

In a conventional MUNIN project, requirements of communication required for the operation of maritime autonomous surface ships are analyzed and presented as communication lower limit requirements in [Table 1], including rendezvous in which a manned vessel approaches a maritime autonomous surface ship, remote control, telemetry, radar targets, and HD video.

TABLE 1

| Type | Bandwidth | Latency | Direction |
| --- | --- | --- | --- |
| Rendezvous | 2 kbps | 50 ms | Ship ↔ Ship |
| Remote control | 2 kbps | 1 sec | Ship ↔ Shore |
| Telemetry | 32 kbps | 1 sec | Ship → Shore |
| Radar and targets | 75 kbps | 1 sec | Ship → Shore |
| HD Video | 3 Mbps | 2.5 sec | Stup → Shore |

The required communication speeds for the rendezvous, remote control, etc., which are presented in [Table 1], may be viewed as respective low levels acceptable even by existing legacy maritime communication systems. However, considering current maritime autonomous surface ships with respect to the surrounding situation awareness, demand for collected information exchange, and land monitoring such as a digital twin, the required communication speeds should be significantly increased to Mbps levels.

Occurrence of a maritime accident causes large-scale damage, so the higher the level of autonomy and automation of ship, the higher the communication performance should be, and cost-effective comparison of these relationships is important.

In Namgung (2019), a formula considering the number of maritime autonomous surface ships per communication base station, frequency use efficiency, the amount of data required per ship, and the like, is used in order to calculate communication capacity required for the maritime autonomous surface ships.

Considering the VTS communication importance in ports and harbors, collision avoidance, sensor information collection, etc., this related art proposes that a spectrum of about 0.8 MHz is required per maritime autonomous surface ship, and proposes that a spectrum of 11.3 MHz for downlink standard and 103.9 MHz for uplink standard are required by integrally applying the distribution of ships in major ports in South Korea.

The reason why more bandwidths are required for the uplink for transmitting data to land may be interpreted as because at present, the level of autonomy of maritime autonomous surface ships is not yet high and control on land is important.

In relation the to possibility of using MX-S2X's unlicensed band frequencies, a study by Kumar (2019) estimates that an operation range is about 13 km along with the possibility of maritime use of V2X communication technology. Moreover, while raising the need to establish a concept of communication technology of ship operator-centric networking (S2X), a study by Kang et al. (2019) emphasizes the need for preemptive introduction of additional communication technologies due to saturation of AIS or the like available for ship-to-ship communication for the surrounding situation awareness of maritime autonomous surface ships.

VHF data exchange system (VDES) is a next-generation maritime wireless communication system for transmitting and receiving AIS, application specific message (ASM), and VDE data between ships and ships and between ships and coastal stations, and ITU-R M. 2092 recommendation has been distributed in 2021 on the basis of the technical standard G1139, which is developed by the International Association of Marine Aids to Navigation and Lighthouse Authorities (IALA).

Considering future utilization of marine mobility, maritime autonomous surface ships, and the like, a data transmission rate required for MX-S2X communication technology should be at least 3 Mops or more according to [Table 1] above. A transmission speed of a VDE physical layer is up to 307.2 kbps, and when the transmission speed is calculated by using solely pure user data excluding CRC, an actual payload transmission speed is up to 209.4 kbps. Although VDE provides a communication speed higher than 9.6 kbps of existing AIS and those of other communications, the communication speed is in a level unable to provide the least required speed for maritime autonomous surface ships.

In communication for maritime safety, a communication network capable of supporting various forms of mobility should be provided. Since VDES provides a TDMA network composed of 2,250 slots per minute, slot saturation may occur in sea areas where a plurality of ships are congested. This is why improvements such as securing additional slot space are required to ensure that there are no restrictions on the network operation of multiple types of marine mobility expected in the future.

The impacts of multipath fading in poor maritime environments should be overcome, but in fact, sufficient consideration has not been made in existing maritime communication technologies. In studies of Kim et al. (2017) and Ryu et al. (2018), in the case of VDE, using Syncword may be considered to overcome the impacts of multipath fading, but sufficient performance may not be provided due to 27 short symbols. Therefore, designing a physical layer to overcome the impacts of multipath fading and Doppler effects by analyzing influences in maritime environments for time/frequency synchronization and equalization most functions is the important subject matter of research and development.

Accordingly, the present disclosure proposes a method of maximally reducing the impacts of multipath fading caused by sea level and expected in a case where a high frequency band is used at sea in order to develop MX-S2X communication that utilizes communication technology of broadband based on high frequencies (hereinafter referred to as MX) higher than a band having 300 MHz or less allocated to existing maritime mobile services.

Figure 1:
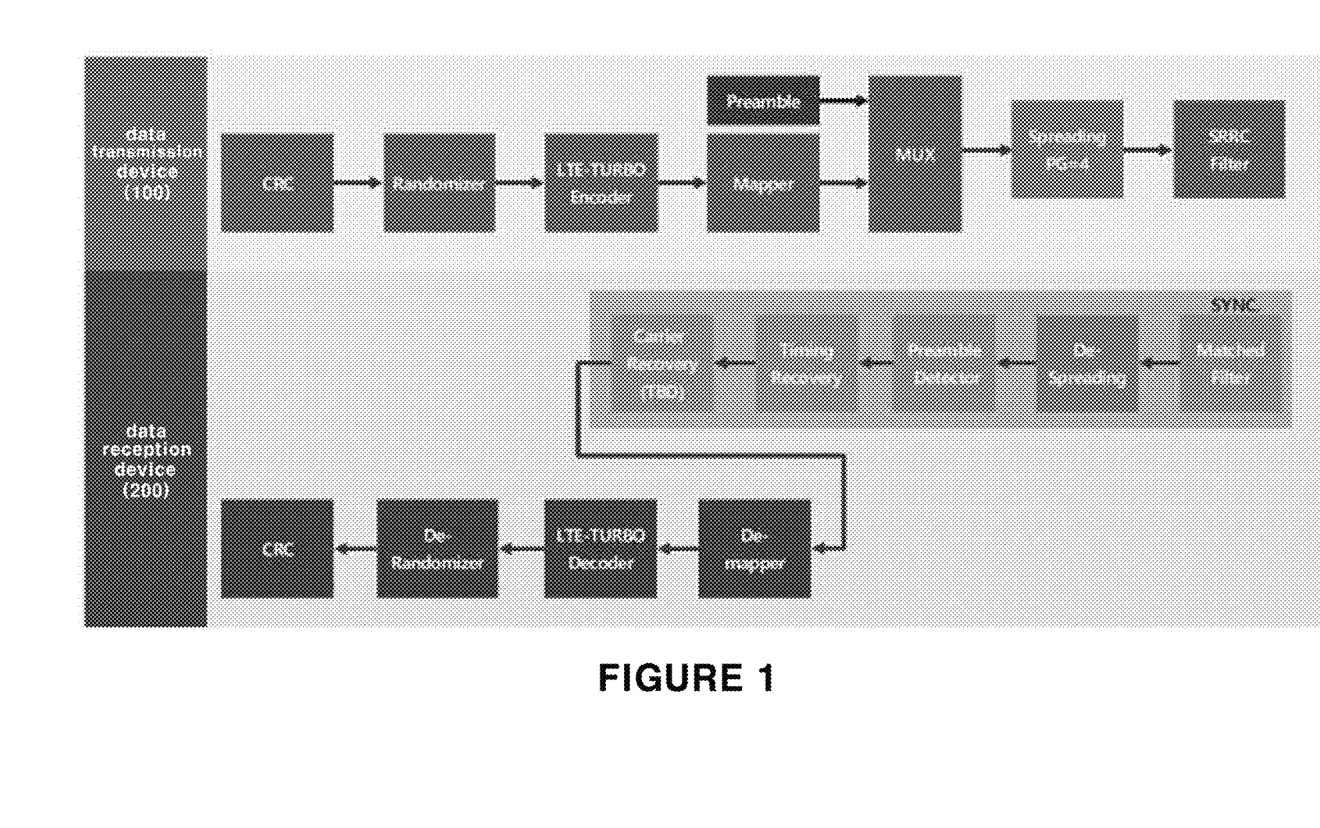
FIG. 1 is a network configuration view illustrating a ship-centric direct communication system according to an exemplary embodiment of the present disclosure.

FIG. 1 is a network configuration view illustrating the ship-centric direct communication system according to the exemplary embodiment of the present disclosure.

Referring to FIG. 1, the ship-centric direct communication system includes a data transmission device 100 and a data reception device 200.

The data transmission device 100 transmits, to the data reception device 200 through a link channel, a transmission frame composed of a plurality of slots generated according to slot time, a plurality of pilots provided for channel estimation and arranged at respective specific positions in each of the plurality of slots according to a pilot transmission period, and data symbols arranged between each of the plurality of pilots First, the data transmission device 100 generates each slot according to slot time. In this case, the slot time is calculated by a ship movement speed in consideration of a correlation time of a communication environment in which the ship-centric direct communication system according to the exemplary embodiment of the present disclosure is operated.

In this case, in a case of assuming that a ship's movement speed requirement is up to 50 km/h, a Doppler frequency is up to 111.11 Hz, and a correlation time is about 3.8 ms. Accordingly, in the present disclosure, considering the correlation time, the slot time is 2 ms.

As described above, in a case where the slot time is 2 ms, pilot transmission is executable in units of several SC-FDE symbols, and a structure is also applicable in the SC-FDE symbol form same as a data structure. In this case, since an FFT size is the same as that of a data symbol, an entire FFT output result may be used for channel estimation and compensation.

Thereafter, the data transmission device 100 arranges each pilot in a slot according to the pilot transmission period for channel estimation. In this case, the pilot transmission period for channel estimation is determined according to the maximum Doppler frequency and a frequency offset.

A frequency offset requirement standard is based on a maximum frequency offset of 500 Hz with reference to VDES. The phase rotation according to the maximum frequency offset including the Doppler frequency in the slot time is (111.11 Hz+500 Hz)×2 ms×360 degrees=approximately 440 degrees, which exceeds 360 degrees of phase by which maximum estimated compensation is applicable, so the pilots are arranged and transmitted in units of approximately 1 ms.

As described above, the pilot transmission period for channel estimation should be taken into account for the maximum Doppler frequency and frequency offset. The frequency offset requirement standard is based on a maximum frequency offset of 500 Hz applied with reference to VDES.

Figure 2:
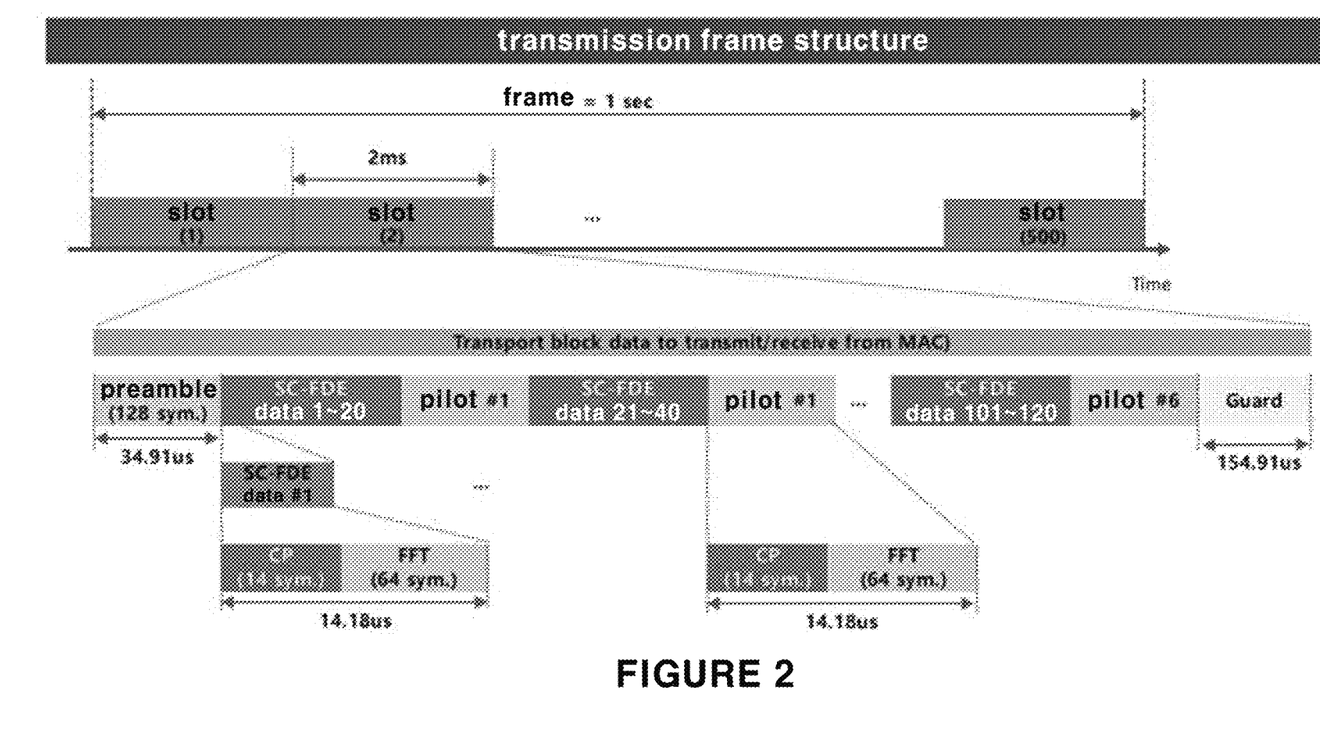
FIG. 2 is a view illustrating a structure of transmission frame according to the exemplary embodiment of the present disclosure.

The phase rotation according to the maximum frequency offset including the Doppler frequency in the slot time is (111.11 Hz+500 Hz)×2 ms×360 degrees=approximately 440 degrees, which exceeds 360 degrees of phase by which maximum estimated compensation is applicable, so pilots are arranged and transmitted in units of approximately 1 ms. In this case, the MX-S2X slot structure allocates three pilots per fundamental slot and is configured as shown in FIG. 2.

Accordingly, in the case where the slot time is 2 ms, the pilots are arranged in units of 1 ms. For example, the data transmission device 100 may arrange respective pilots at the front, middle, and back of a slot and designate the respective pilots as pilot #1, pilot #2, and pilot #3.

As described above, the reason why the data transmission device 100 arranges the pilots in the slot according to the pilot transmission period is that each of the pilots is used to correct FFT output for data present between the pilots by performing linear interpolation after the channel estimation in the frequency domain.

For example, in a case where pilots #1, #2, and #3 are arranged at respective specific positions in a slot, a channel estimation result $H_1$ from pilot #1 and a channel estimation result $H_2$ from pilot #2 are used for linear interpolation to derive $H_{i12}$. Pilot arrangement and utilization to operate in such a method will be described in FIG. 3.

When receiving a transmission frame from the data transmission device 100, the data reception device 200 performs linear interpolation after the channel estimation in the frequency domain by using the plurality of pilots for each of the plurality of slots of the transmission frame, performs channel compensation on data present between each pilot, and converts channel-compensated signals back into time domain symbols.

More specifically, the data reception device 200 performs the channel estimation and compensation in the frequency domain. In this case, the data reception device 200 performs the channel estimation and compensation by using a method of estimating frequency-domain least squares (LS). In this case, equations of calculation processes for channel estimation and compensation are as follows.

$$H_j(k) = \frac{R_j(k)}{S_j(k)} \quad \text{[Equation 1]}$$

$R_j(k)$: j-th received reception pilot,
$S_j(k)$: j-th transmitted transmission pilot,
k: subcarrier number, corresponding to FFT output number
$H_j(k)$: channel estimation result obtained as result of LS calculation for $R_j(k)$ and $S_j(k)$ $$H_{i_{12}}(k) = H_1 \times \frac{(C-i)}{C} + H_2 \times \frac{i}{C} \quad (C=10, i=0\sim 8) \quad \text{[Equation 2]}$$

$H_1$: LS calculation result obtained from pilot #1
$H_2$: LS calculation result obtained from pilot #2
$H_{12}$: result of linear interpolation between pilot #1 and pilot #2
k: subcarrier number, corresponding to FFT output number
C is number obtained by adding 1 to number of data symbols between pilots, $$H_{i_{23}}(k) = H_2 \times \frac{(C-i)}{C} + H_3 \times \frac{i}{C} \quad (C=10, i=9\sim 17) \quad \text{[Equation 3]}$$

$H_{23}$: result of linear interpolation between pilot #2 and pilot #3
$H_2$: LS calculation result obtained from pilot #2
$H_3$: LS calculation result obtained from pilot #3
k: subcarrier number, corresponding to FFT output number
C is number obtained by adding 1 to number of data symbols between pilots, The above [Equation 2] and [Equation 3] represent a linear interpolation method for $H_j(k)$, where C corresponds to a number obtained by adding 1 to the number of data symbols between pilots, and depending on positions, a reflection proportion of channel estimation results for the left and right pilots varies.

$$\sigma_{i_{12}}(k) = \sigma_1 \times \frac{(C-i)}{C} + \sigma_2 \times \frac{i}{C} \quad (C=10, i=0\sim 8) \quad \text{[Equation 4]}$$

$\sigma_{12}$: noise variance between pilot #1 and pilot #2,
$\sigma_1$: noise variance obtained from pilot #1,
$\sigma_2$: noise variance obtained from pilot #2,
C is number obtained by adding 1 to number of data symbols between pilots,
k: subcarrier number, corresponding to FFT output number, $$\sigma_{i_{23}}(k) = \sigma_2 \times \frac{(C-i)}{C} + \sigma_3 \times \frac{i}{C} \quad (C=10, i=9\sim 17) \quad \text{[Equation 5]}$$

$\sigma_2$: noise variance obtained from pilot #2,
$\sigma_3$: noise variance obtained from pilot #3,
$\sigma_{23}$: noise variance between pilot #2 and pilot #3,
[Equation 4] and [Equation 5] represent a linear interpolation method for noise variance.

$$H'_{i_q}(k) = \frac{H_{i_q}(k)}{H_{i_q}(k) + \sigma_{i_q}} \quad (q = \text{'}12\text{'} @ i=1\sim 9, \text{'}23\text{'} @ i=1\sim 9) \quad \text{[Equation 6]}$$

k: subcarrier number, corresponding to FFT output number,
$H'_{i_q}(k)$: data section channel compensation filter applying linear minimum mean square error (LMMSE) method by using Hiq(k) and noise variance

[Equation 6] shows a process of deriving a data section channel compensation filter H'iq(k) applying the linear minimum mean square error (LMMSE) method by using $H_1(k)$ and noise variance.

$$R'_i(k) = \frac{R_i(k)}{H'_{i_q}} \quad (q = \text{'12'} @ i = 0{\sim}8, q = \text{'23'} @ i = 9{\sim}17)$$ [Equation 7]

k: subcarrier number, corresponding to FFT output number, $R_i(k)$: channel-compensated signal obtained by dividing $R_i(k)$ in frequency domain FIG. 2 is a view illustrating a structure of a transmission frame according to the exemplary embodiment of the present disclosure.

Referring to FIG. 2, a transmission frame is composed of a plurality of slots generated according to slot time, a plurality of pilots provided for channel estimation and arranged at respective specific positions in each of the plurality of slots according to a pilot transmission period, and data symbols arranged between each of the plurality of pilots. In this case, the data symbols are as shown in [Table 2].

TABLE 2

| Parameter | value |
| --- | --- |
| Data rate [Mbps] | 4.448 |
| FFT size | 512 |
| CP duration [μs] | 2.6 |
| Data SC-FDE duration [μs] | 85.94 |
| Pilot SC-FDE duration [μs] | 85.94 |
| Training sequence duration [μs] | 91.15 |
| Symbol rate [Mhz] | 6.144 |
| Bandwidth [Mhz] | 7.9872 |
| Slot duration [ms] | 2 |
| Ramp up/down duration [μs] | 10.42 |
| Guard time [μs] | 83.33 |

In this case, in order to meet a data transmission requirement (≥3 Mbps), the data transmission device 100 allocates 18 data symbols per slot, and may achieve a data transmission rate of 4.448 Mops when a design is taken into account by applying convolutional turbo code (CTC) ½ used as a channel codec, QPSK modulation method, a symbol rate of about 6.144 MHz, and a slot time to be allocated with 500 slots per second.

A length of cyclic prefix (CP) for SC-FDE is designed to be larger than a maximum delay among effective components in a channel response in order to eliminate ISI effects due to multipath. A maximum delay time to be considered in a case where a channel response is measured in a maritime environment is 2.2 μs. As this maximum delay time is assumed to be similar in a domestic maritime environment of South Korea, the CP length is designed to be 2.6 μs and is allocated with 16 symbols based on a symbol rate.

Figure 3:
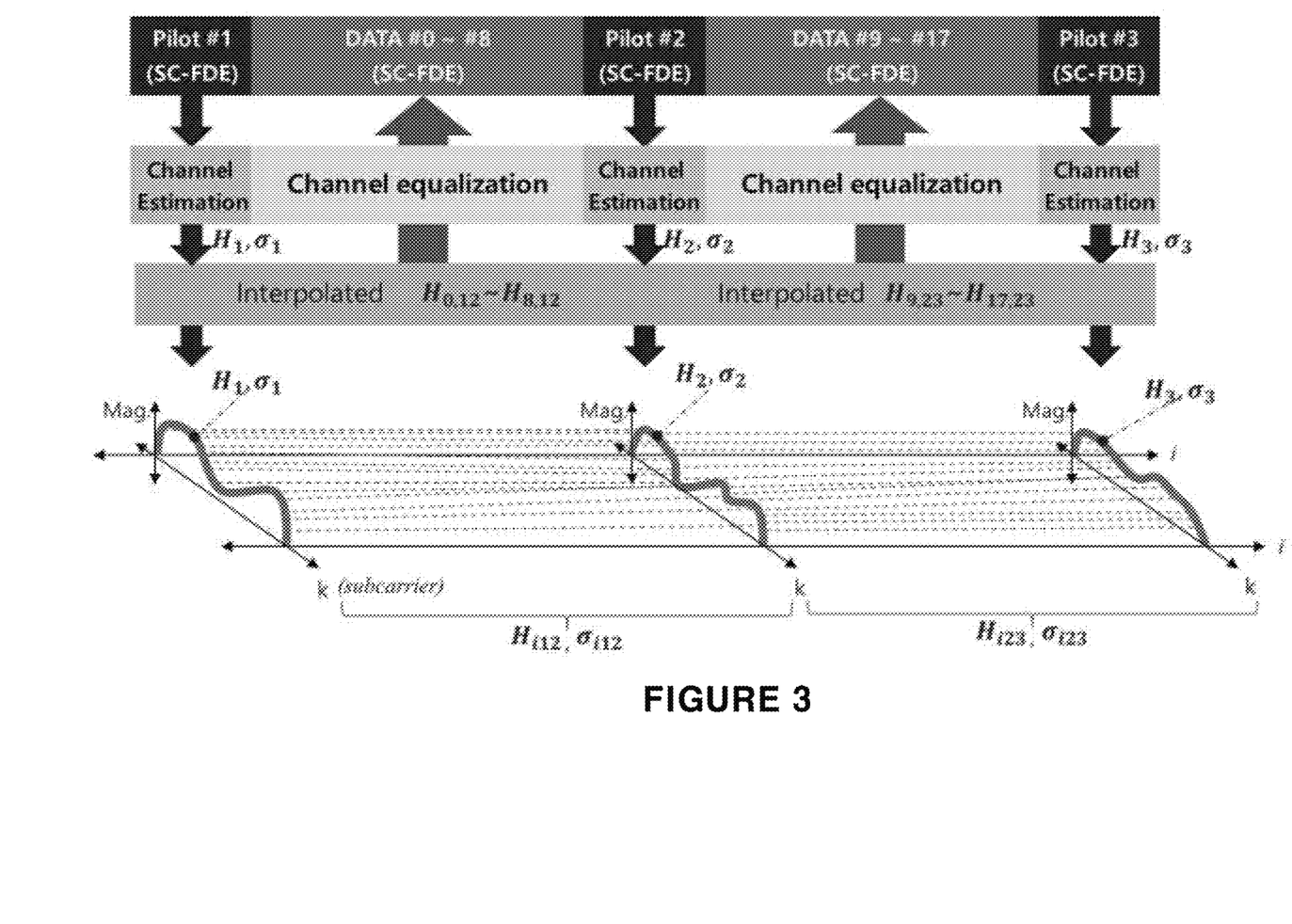
FIG. 3 is a view illustrating a process of linear interpolation channel estimation between adjacent pilots according to the exemplary embodiment of the present disclosure.
Figure 4:
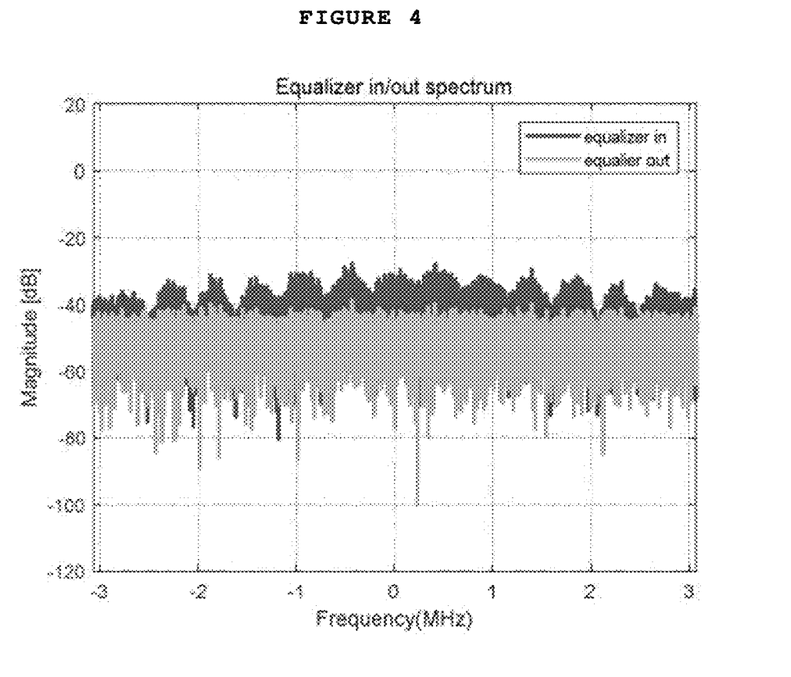
FIGS. 4 to 8 are graphs illustrating respective test results of the ship-centric direct communication system according to the exemplary embodiment of the present disclosure.

FIG. 3 is a view illustrating a process of linear interpolation channel estimation between adjacent pilots according to the exemplary embodiment of the present disclosure.

Referring to FIG. 3, when receiving a transmission frame from the data transmission device 100, the data reception device 200 performs linear interpolation after channel estimation in a frequency domain by using a plurality of pilots (pilot #1, pilot #2, and pilot #3) for each of a plurality of slots of the transmission frame, performs channel compensation on data present between each pilot, and converts channel-compensated signals back into time domain symbols.

The data reception device 200 performs, for pilot #1, linear interpolation after the channel estimation in the frequency domain by using a noise variance $\sigma_1$ obtained from pilot #1 and an LS operation result $H_1$ obtained from pilot #1, performs, for pilot #2, linear interpolation after the channel estimation in the frequency domain by using a noise variance $\sigma_2$ obtained from pilot #2 and an LS operation result $H_2$ obtained from pilot #2, and performs, for pilot #3, linear interpolation after the channel estimation in the frequency domain by using a noise variance $\sigma_3$ obtained from pilot #3 and an LS operation result $H_3$ obtained from the pilot #3.

In addition, the linear interpolation result $H_{12}$ from when pilot #1 is received until pilot #2 is received is calculated by using the LS operation result $H_1$ obtained from pilot #1, the LS operation result Hz obtained from pilot #2, and a number C obtained by adding 1 to the number of data symbols between pilot #1 and pilot #2. A noise variance $\sigma_{12}$ is calculated by using a noise variance $\sigma_1$ obtained from pilot #1, a noise variance $\sigma_2$ obtained from pilot #2, and the number C obtained by adding 1 to the number of data symbols between pilot #1 and pilot #2.

In addition, the linear interpolation result $H_{23}$ from when pilot #2 is received until pilot #3 is received is calculated by using the LS operation result Hz obtained from pilot #2, the LS operation result $H_3$ obtained from pilot #3, and a number C obtained by adding 1 to the number of data symbols between pilot #2 and pilot #3. A noise variance $\sigma_{23}$ is calculated by using a noise variance $\sigma_2$ obtained from pilot #2, a noise variance $\sigma_3$ obtained from pilot #3, a number C obtained by adding 1 to the number of data symbols between pilot #2 and pilot #3.

As described above, the linear interpolation is performed after channel estimation in the frequency domain by using the plurality of pilots for each of the plurality of slots, the channel compensation is performed on the data present between each pilot, and the channel-compensated signals are converted back into the time domain symbols.

FIGS. 4 to 8 are graphs illustrating respective test results of the ship-centric direct communication system according to the exemplary embodiment of the present disclosure.

Figure 5:
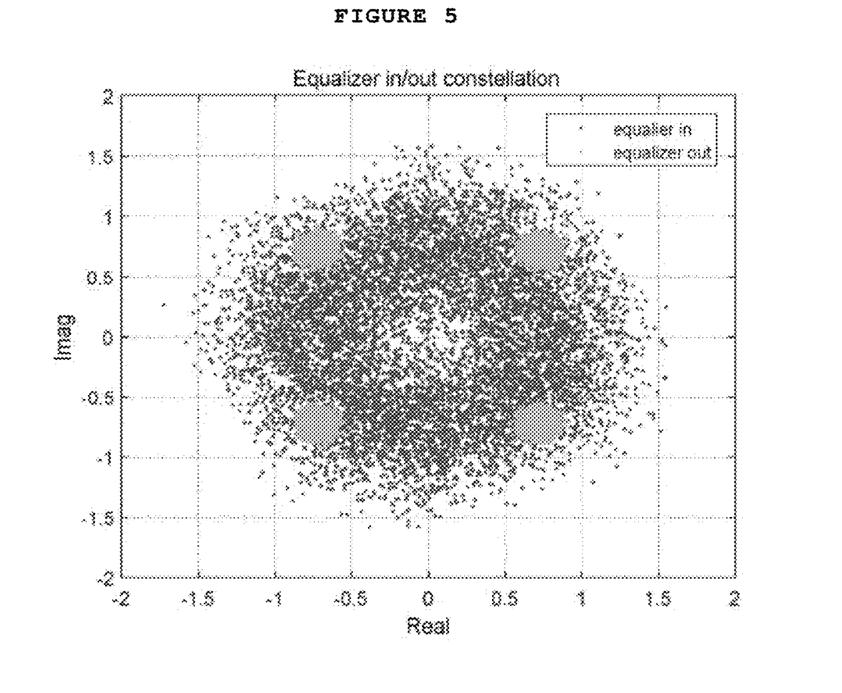
Figure 6:
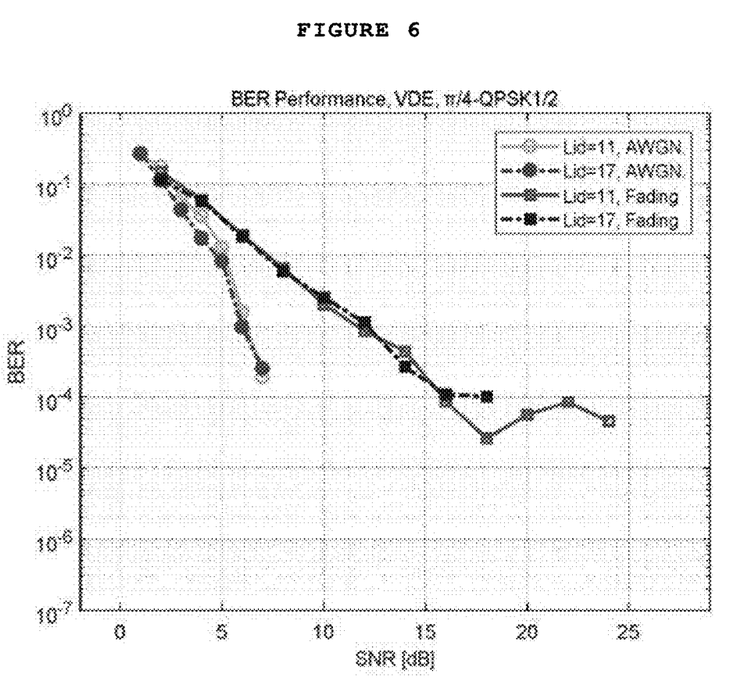

Referring to FIGS. 4 to 8, in the spectrums of operation test results, it may be confirmed that a spectrum of an equalizer input signal in FIG. 6 shows a form of a frequency selective fading spectrum due to multipath fading, but a spectrum of an equalizer output signal shows a spectrum in which the multipath impacts are overcome.

In FIG. 5, it may be confirmed that output symbols may show apparent QPSK constellation points compared to equalizer input symbols. BER performance of a VDE physical layer is confirmed for a channel model for a maritime communication environment, and validity of performance analysis and design of an MX-S2X physical layer is confirmed for the same maritime channel.

Delay and power profiles are applied to a multipath fading channel for maritime communication, and since VDE and MX-S2X have respective operating frequencies of 161.8375 MHz and 2.4 GHz different from each other, respective Doppler frequencies of VDE and MX-S2X are applied with 7.4925 Hz and 111.11 Hz. In addition, a Rician K-factor is set to 14 dB (approximately 25.1) by assuming that line-of-sight (LOS) is guaranteed.

Hereinafter, by comparing simulation test results and real sea test results in a VDE 100 kHz bandwidth mode for a multipath fading channel model, the validity of the multipath fading channel model of Yang (2010) will be confirmed. For the VDE 100 kHz bandwidth mode, respective performance under AWGN and the multipath fading channel model of Yang (2010) is shown in FIGS. 6 and 7.

Figure 7:
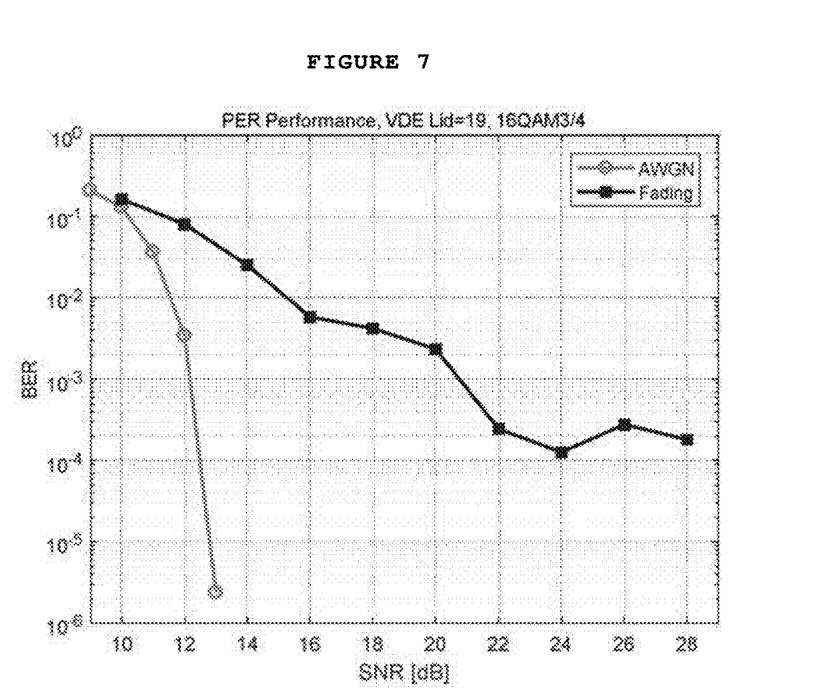

FIG. 6 shows a result of applying π/4-QPSK modulation and Turbo code (code rate of 1/2) to Link IDs 11 and 17, and FIG. 7 shows a result of applying 16 QAM modulation and Turbo code (code rate of 3/4) to Link ID 19. In all of the above results based on BER $1 \times 10^{-4}$, it may be confirmed that the performance of the multipath fading channel deteriorates by approximately 8 dB compared to the performance of AWGN, and the performance of the multipath fading channel shows an error floor trend.

In such an error floor trend in real sea tests, it may be confirmed that errors occur in the packet success ratio (PSR) measurement results even in environments where the ship station reception SNR is sufficient.

It may be seen that such test results are obtained by ISI effects due to multipath, so the effects appear as frequency-selective fading in the frequency domain, whereby signal quality is deteriorated. A degree to which the signal quality is deteriorated may be determined by the impacts of the delay and power profiles on a target signal. A method that allows for easy quantitative determination may be performed by determining the impacts of the maximum delay time defined in the channel model on a symbol unit.

Figure 8:
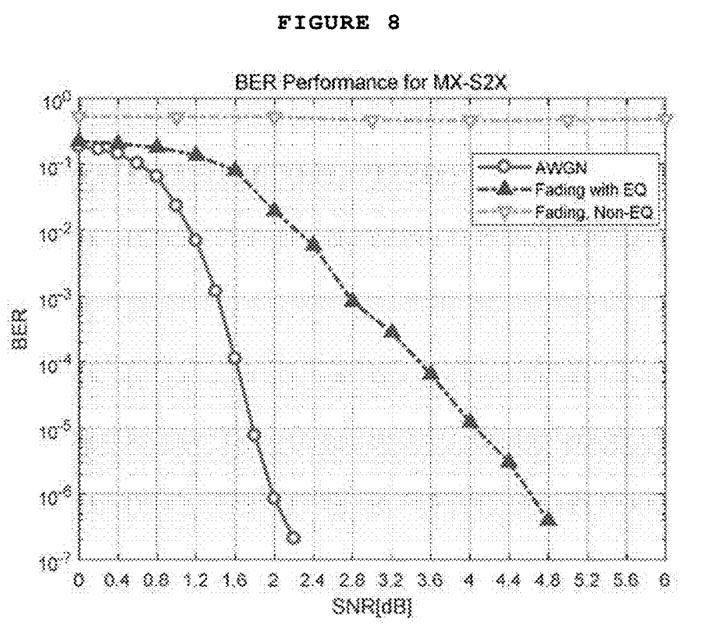

FIG. 8 is a view illustrating a result of analyzing BER performance of an MX-S2X physical layer. An AWGN channel shows performance of BER $1 \times 10^{-4}$ at SNR 1.6 dB. As a result of analyzing performance in a case of not applying channel compensation and not going through the equalizer in FIG. 4 in order to confirm the impacts on SNR on the channel model in Yang (2010), it is confirmed that the BER is approximately $5 \times 10^{-1}$, whereby a normal communication channel is not provided. As a result of analyzing performance in a case of channel compensation performed in the equalizer in order to confirm the performance of the MX-S2X physical layer, it is confirmed that the performance shows a BER $1 \times 10^{-4}$ at SNR 3.5 dB, whereby operation is performed within a range of approximately 2 dB degradation compared to that of AWGN.

In a case where a channel compensation function is not applied, a symbol rate of MX-S2X is 6.144 MHZ, so the maximum delay of 2.2 us in the channel model of Yang (2010) corresponds to approximately 13.52 symbols in the MX-S2X symbols. The impacts of such a delay profile act as interference received at different magnitudes and phases within VDE symbols, causing deterioration of reception signal quality due to ISI effects. The impacts of maximum delay in MX-S2X are further affected by more performance deterioration due to the summation of signals between different symbols as well as the different magnitudes and different phases.

In the analyzed results in which the error floor does not appear when the equalizer is s applied and particularly the operation is performed within the SNR 2 dB deterioration range, every design may be considered appropriate so that the signal estimation method and compensation method of the equalizer are suitable, sufficient training sequences are allocated due to the slot structure, the pilots are arranged to increase the accuracy of channel estimation, and the slots are transmitted within coherence time. In other words, it is determined that the error floor occurred despite the high SNR is improved by the appropriate design of the physical layer.

Although the present disclosure has been described with reference to limited exemplary embodiments and drawings, the present disclosure is not limited to the above exemplary embodiments, and various modifications and variations may be made from these descriptions by those skilled in the art. Therefore, the spirit of the present disclosure should be understood only by the scope of the claims set forth below, and all equivalent or equivalent modifications thereof shall fall within the scope of the spirit of the present disclosure.

What is claimed is:

1. A ship-centric direct communication system comprising a data transmission device and a data reception device, the ship-centric direct communication on system comprising:

the data transmission device configured to transmit, to the data reception device through a link channel, a transmission frame composed of a plurality of slots generated according to slot time, a plurality of pilots provided for channel estimation and arranged in each of a front, middle, and back of the plurality of slots according to a pilot transmission period, and data symbols arranged between each of the plurality of pilots; and the data reception device configured to perform channel compensation for data present between the plurality of pilots by using the plurality of pilots for each of the plurality of slots of the transmission frame in response to receiving the transmission frame from the data transmission device and performing linear interpolation after the channel estimation in a frequency domain, and convert channel-compensated signals back into time domain symbols, wherein the data reception device performs, for a first pilot, a first linear interpolation after the channel estimation in the frequency domain by using a first noise variance $\sigma_1$ obtained from the first pilot and a first least squares (LS) operation results $H_1$ obtained from the first pilot, performs, for a second pilot, a second linear interpolation after the channel estimation in the frequency domain by using a second noise variance $\sigma_2$ obtained from the second pilot and a second LS operation results $H_2$ obtained from the second pilot, and performs, for a third linear interpolation after the channel estimation in the frequency domain by using a third noise variance $\sigma_3$ obtained from the third pilot and a third LS operation results $H_3$ obtained from the third pilot, wherein a third linear interpolation result $H_{12}$ determined from a time the first pilot is receive until a time the second pilot is received is calculated by using the first LS operation results $H_1$, the second LS operation results $H_2$, and a first number $C_1$ obtained by adding 1 to a first number of data symbols between the first pilot and the second pilot, wherein a fourth linear interpolation results $H_2$ determined from a time the second pilot is received until a time the third pilot is received is calculated by using the LS operation result $H_2$, the third LS operation results $H_2$, and second number $C_2$ obtained by add 1 to a second number of data symbols between the second pilot and the third pilot, wherein a fourth noise variance $\sigma_{12}$ is calculated by using the first noise variance $\sigma_1$, the second noise variance $\sigma_2$, and a third number $C_3$ obtained by adding 1 to a third number of data symbols between the first pilot and the second pilot, wherein a fifth noise variance $\sigma_{23}$ is calculated by using the first noise variance $\sigma_2$, the third noise variance $\sigma_3$, and a fourth number $C_4$ obtained by adding 1 to a fourth number of data symbol between the second pilot and the third pilot.

2. A method of operating a ship-centric direct communication system, the method comprising:

transmitting, by a data transmission device to a data reception device through a link channel, a transmission frame composed of a plurality of slots generated according to slot time, a plurality of pilots provided for channel estimation and arranged in each of a front, middle, and back of the plurality of slots according to a pilot transmission period, and data symbols arranged between each of the plurality of pilots;

performing, by the data reception device, channel compensation for data present between the plurality of pilots by using the plurality of pilots for each of the plurality of slots of the transmission frame in receiving the transmission frame and by performing linear interpolation after the channel estimation in a frequency domain; and converting, by the data reception device, channel-compensated signals back into time domain symbols, wherein performing, by the reception device, the channel compensation for the data present between the plurality of pilots by performing the linear interpolation after the channel estimation in the frequency domain includes, performing, for a first pilot, a first linear interpolation after the channel estimation in the frequency domain by using a first noise variance $\sigma_1$ obtained from the first pilot and a first least squares (LS) operation result $H_1$ obtained from the first pilot, performing, for a second pilot, a second linear interpolation after the channel estimation in the frequency domain by using a second noise variance $\sigma_2$ obtained from the second pilot and a second LS operation result $H_2$ obtained from the second pilot, and performing, for a third pilot, a third linear interpolation after the channel estimation in the frequency domain by using a third noise variance $\sigma_3$ obtained from the third pilot and a third LS operation result $H_3$ obtained from the third pilot, wherein a fourth liner interpolation results $H_{12}$ determined from a time the first pilot is received until a time when the second pilot is received is calculated by using the first LS operation results $H_1$, the second LS operation result $H_2$, and a first number $C_1$ obtained by adding 1 to a first number of data symbols between the first pilot and the second pilot, wherein a fifth linear interpolation result $H_{23}$ determined from a time the second pilot is received until a time the third pilot is received is calculated by using the second LS operation result $H_2$ the third LS operation result $H_3$, and a second number $C_2$ obtained by adding 1 to a second number of data symbols between the second pilot and the third pilot, wherein a fourth noise variance $\sigma_{12}$ is calculated by using the first noise variance $\sigma_1$, the second noise variance $\sigma_2$, and a third number $C_3$ obtained by adding 1 to a third number of data symbol between the first pilot and the second pilot, wherein a fifth noise variance $\sigma_{23}$ is calculated by using the second noise variance $\sigma_2$, the third noise variance $\sigma_3$, and a fourth number $C_4$ obtained by adding 1 to a number of data symbols between the second pilot and the third pilot.

* * * * *